United States Patent [19]
Lachmann et al.

[11] Patent Number: 4,476,888
[45] Date of Patent: Oct. 16, 1984

[54] OVERPRESSURE VALVE

[75] Inventors: Helmüt Lachmann, Essen; Bernd Lange, Berlin, both of Fed. Rep. of Germany

[73] Assignees: Dr. H. Tiefenbach GmbH & Co., Essen; Borsig GmbH, Berlin, both of Fed. Rep. of Germany

[21] Appl. No.: 400,669

[22] Filed: Jul. 22, 1982

[30] Foreign Application Priority Data

Aug. 12, 1981 [DE] Fed. Rep. of Germany ....... 3131817

[51] Int. Cl.³ ........................................... G05D 16/10
[52] U.S. Cl. ................................ 137/102; 137/505.13
[58] Field of Search .................. 137/102, 116.3, 116.5, 137/461, 505.13

[56] References Cited

U.S. PATENT DOCUMENTS

| | | | |
|---|---|---|---|
| 310,347 | 1/1885 | Westinghouse | 137/116.3 |
| 1,238,051 | 8/1917 | Peterson | 137/505.13 |
| 2,285,049 | 6/1942 | Parks | 137/505.13 X |
| 3,512,560 | 5/1970 | Weise | 137/102 |
| 4,384,590 | 5/1983 | Friend | 137/102 |

FOREIGN PATENT DOCUMENTS 2915280 10/1980 Fed. Rep. of Germany .
1060914 4/1954 France .

Primary Examiner—Robert G. Nilson
Attorney, Agent, or Firm—Karl F. Ross; Herbert Dubno

[57] ABSTRACT

An overpressure-control valve has a valve housing formed with a front output chamber, a back intake chamber adjacent and back of the output chamber, and a valve seat lying between the chambers. A valve body can move in the housing forward toward the valve seat into a closing position on the seat and blocking flow between the chambers and backward from the valve seat and into an open position permitting flow between the chambers. This body has at least one forwardly directed face and at least one backwardly directed face exposed in the chambers. The effective surface area of the forwardly directed face is greater than that of the backwardly directed face. A spring urges the valve forward into the open position with a predetermined generally constant biasing force so that the valve body moves back against the spring into the closed position when the backwardly effective pressure on the forward face overcomes both the force of the spring and the pressure on the back face.

11 Claims, 2 Drawing Figures

OVERPRESSURE VALVE

FIELD OF THE INVENTION

The present invention relates to an overpressure valve. More particularly this invention concerns a valve which normally permits flow between its intake and output sides, but which closes when pressure at its intake side exceeds a predetermined limit.

BACKGROUND OF THE INVENTION

A standard overpressure control valve, as described in German patent document No. 2,915,280, is of the holding type, that is once it opens it stays open. The valve has an output chamber connected to the downstream line, an intake chamber connected to the upstream or control line, and a valve seat between these chambers. A valve body can be moved between a closed position on the seat and preventing fluid flow between the chambers and an open position permitting such flow.

Such a valve has a spring urging it into the open position. The pressure of the intake chamber is somehow effective on the valve body in a direction opposite that of the spring force, so that when this pressure exceeds a predetermined level the valve will close. If the forces were reversed the arrangement would be an underpressure valve that closes when the pressure on one side drops below a predetermined level.

Such a valve is not effective, once it closes, if the pressure upstream drops too much, in which case it will open. Thus when, for instance, installed in a gas main to protect downstream users from dangerous overpressures, it will open if the upstream overpressure valve itself closes to depressurize its upstream side. Opening under these circumstances can be dangerous.

Another such valve is described in French Pat. No. 1,060,914. It similarly uses the pressure in the line to hold it open. A disadvantage of this system is that when the pressure drops the valve opens at virtually the same pressure at which it closed. What is more, such a valve cannot be used to control pressure in the downstream line, only to cut if off from the upstream line, and cannot possible control pressure in a downstream line in accordance with that of an upstream line.

As mentioned above, such valves are installed in natural-gas mains to prevent the pressure therein, which can be as much as 15bar, from rising above a predetermined level. This is done to protect downstream users of the gas and makes transportation through the pipeline more efficient. Normally such a gas main is provided with main valves that subdivide it into sections and with pressurizers to keep the pressure up. In addition so-called safety valves close the line when the pressure downstream drops below a predetermined lower level. The control valves of the instant invention prevent the lines from being overpressurized, as for instance in the vent of pressurizer failure.

The standard control valve is occasionally subjected to considerable pressures, as when a compressor upstream does not shut down at the upper pressure limit. Thus these valves are periodically acted on by forces far above their nominal ratings. When they have rotary actuators they can become wedged on or off, and will be subject to great stress and wear in the event of a serious upstream overpressure.

OBJECTS OF THE INVENTION

It is therefore an object of the present invention to provide an improved control valve.

Another object is the provision of such a control valve which overcomes the above-given disadvantages.

Yet another object is to provide an overpressure-control valve which can also depressurize a downstream conduit when it cuts it off from the upstream line, to protect equipment connected to this downstream line.

SUMMARY OF THE INVENTION

These objects are attained according to the instant invention in an overpressure-control valve having, as is well known, a valve housing formed with a front output chamber, a back intake chamber adjacent and back of the output chamber, and a valve seat lying between the chambers. A valve body can move in the housing forward toward the valve seat into a closing position on the seat and blocking flow between the chambers and backward from the valve seat and into an open position permitting flow between the chambers. This body has exposed in the chambers at least one forwardly directed face and at least one backwardly directed face. The effective surface area of the forwardly directed face is greater than that of the backwardly directed face. Biasing means urges the valve backward into the open position with a predetermined generally constant biasing force so that the valve body moves back against the biasing means into the closed position when the backwardly effective pressure on the forward face overcomes both the force of the biasing means and the pressure on the back face.

Thus the force effective in the closing direction will be that of the pressure on the back face plus that of the biasing means, normally a simple uniform-constant spring. The force effective in the closing direction is therefore wholly that caused by the pressure on the front face. The pressure on the front face and that on the back face is the same when the valve is open, so that the only force effective opposite the force of the spring is the pressure multiplied by the difference in effective areas of the front and rear valve-body faces. Thus when the pressure is enough to overcome the force of the spring, it will push the valve body into the closed position.

The valve according to this invention has a conduit having an upstream end opening into the back intake chamber and a downstream end opening generally at the back face. This conduit can be constituted by a passage formed in the valve body. It is also possible for the valve to have spacers to permit flow to its back face, or to fit it loosely in the housing to get the fluid to the back face. Such construction is particularly convenient when the valve is used as a two-way valve, that is without a third port controlled by an auxiliary valve.

In accordance with another feature of this invention, the housing has a surface flatly abutting a portion of the back face in the open position. In this manner the effective surface area of the back face is reduced by the portion in the open position. Such construction makes it possible for the valve to reopen at a much lower pressure than the pressure it closed at, a feature that ensures that the valve will only reopen when conditions are back in good order. In addition this construction ensures that once the valve starts to close, its back face will be fully exposed to the pressure and the valve will then close quite rapidly. As soon as this main valve is closed, when it touches the seat it will shut off the output chamber from the pressure upstream. Since the output chamber is normally connected to something that is taking out gas, it normally will depressurize when thus cut off. This action greatly reduces the effective surface area of the sole front face, thereby greatly reducing the backwardly effective force to hold the valve tightly closed. Thus as the valve closes and the pressure in the downstream output chamber drops the force holding the valve closed, even with constant pressure upstream, increases.

The valve can be of the three-way or -port type. In this case the valve body has output and intake back faces respectively exposed in the output and intake chambers and has a vent port. In addition the valve has vent valve means connected to the valve body and openable for connecting the output chamber in the closed position to the vent port. This vent port can be connected to a simple above-ground vent, or to a storage vessel. The output back face is of greater effective surface area than the intake back face and could even constitute the entire back face. Those no special feed conduit or passage is needed for this auxiliary valve.

The valve body according to the invention is provided with a limitedly elastically deformable element forming the seat and complementarily shaped to the valve body. In addition this valve body contacts the element before the vent means opens. Normally for best sealing the element and the valve body have complementary frustoconical surfaces that fit together in the closed position.

With this arrangement the valve will close and then depressurize its downstream side, locking the valve in the closed position securely. No venting of the downstream side is possible until after the valve is fully closed so the valve is quite safe in operation.

In accordance with this invention the vent valve means is a slide valve effective between the output chamber and the vent port and having a valve element fixed to the valve body. Such a valve can hold back considerable pressures, but opens and closed without having to buck the pressure of the fluid passing through it.

Normally means is provided for adjusting the biasing force of the biasing spring, which therefore establishes the opening and closing pressure thresholds of the control valve. In addition the valve body is provided with an actuation element extending back out of the housing so that it can be operated manually.

DESCRIPTION OF THE DRAWING

The above and other features and advantages will become more readily apparent from the following, reference being made to the accompanying drawing in which.

SPECIFIC DESCRIPTION

Figure 1:
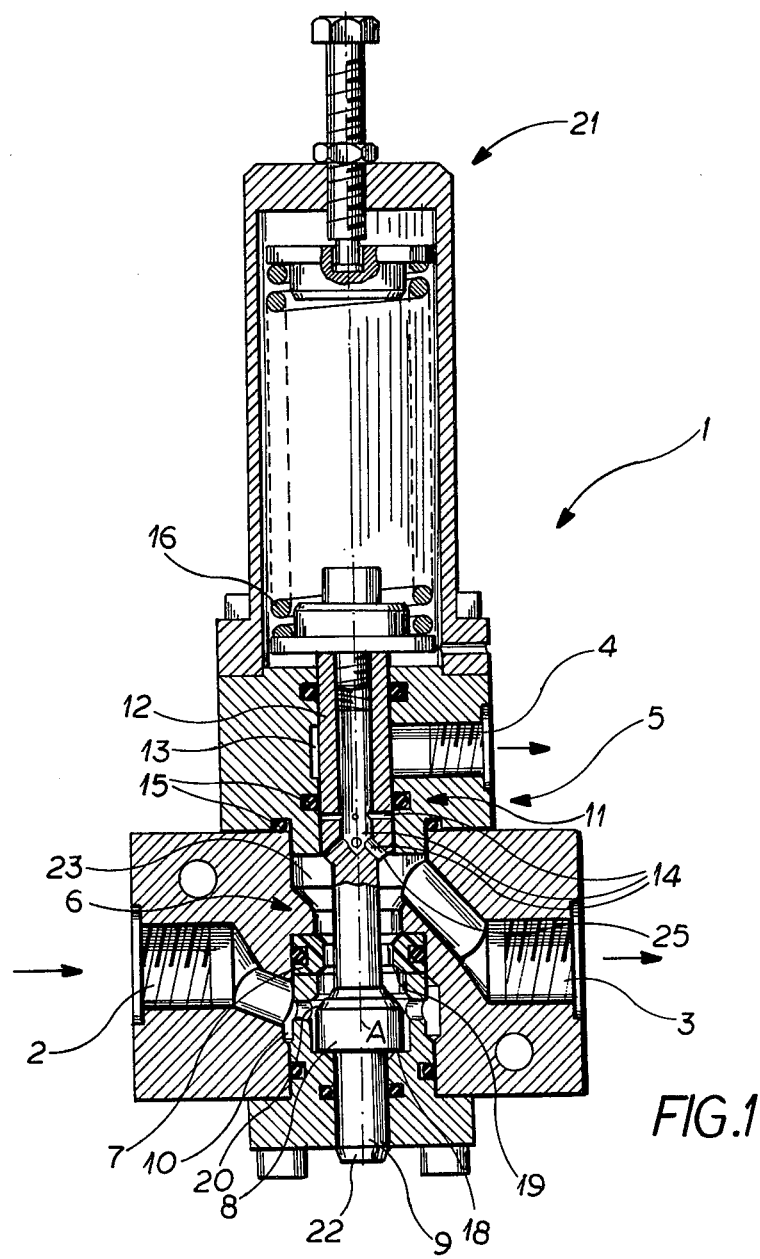
FIG. 1 is an axial section through the valve of this invention.

As seen in FIG. 1, a valve 1 according to this invention has a housing 5 provided with an intake or upstream port 2, a working or output port 3, and a vent or drain port 4. Internally the valve housing 5 is formed with an upstream intake chamber 10 into which the intake port 2 opens, a downstream output chamber 23 into which the output port 3 opens, and a valve seat 7 between these chambers 10 and 23. This seat 7 is formed of an elastomeric synthetic-resin ring having a frustoconical forwardly tapered surface 19.

A main valve 6 is formed principally by a valve body 8 movable along an axis A of the housing 5 and engageable forward, axially upward in the drawing, against the seat 7 to block flow between the chambers 10 and 23. This valve body 8 has an axially extending stem 9 on which is carried the valve body 12 of an auxiliary valve 11 lying between the outlet chamber 23 and a vent chamber 13 connected to the vent port 4. The valve body 12 in turn is formed with passages 14 that form a fluid connection between the chambers 23 and 13 in the closed position of the valve 6 as will be described below. O-rings 15 seal the rod-like part 12 against the housing 5.

A coil-type compression spring 16 has one end braced axially backward against the front end of the stem 9 and an opposite end carried by an adjustment mechanism 21 of standard construction. At its opposite end the stem 9 has an extension 22 that allows manual closing of the valve 6 and opening of the valve 11.

Figure 2:
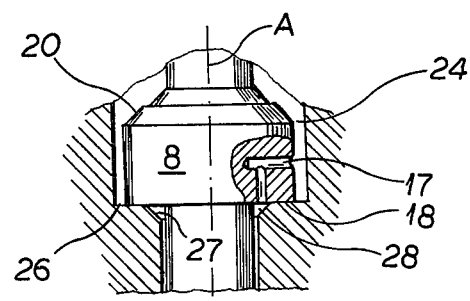
FIG. 2 is a large-scale partly sectional view of a detail of FIG. 1.

As seen in more detail in FIG. 2 the valve body 8 has a forwardly directed frustoconical face 20 that is perfectly complementary to the valve-seat surface 19 and that has an effective surface area $A_{20}$. In addition the valve body 8 has a backwardly directed face 18 of effective surface area $A_{18}$ that can sit in the full-open position on an annular housing surface 26. A bevel or chamfer 27 forms a small annular chamber 28 on the face 18 radially inside the surface 26, and the valve body 8 is formed with passages 17 that feed fluid from the back end 24 of the chamber 10 to the chamber 28. In addition the valve body 12 is formed with a backwardly directed surface 25 that is exposed in the output chamber 23 and that has an effective surface area $A_{25}$.

According to this invention the backwardly directed effective surface area $A_{backward}$ that faces in the closing direction of the main valve body 8, that is axially downward in the drawing, is greater than the forwardly effective surface area $A_{forward}$ that faces in the opening direction. According to the invention:

$$A_{backward} = (A_{18} + A_{25}) A_{forward} = A_{20}.$$

Taking P as the pressure at the port 2 and $F_{16}$ as the backwardly effective force of the spring 16, the force $F_{total}$ effective on the body 8 is defined by:

$$F_{16} - P(A_{backward} - A_{forward}) = F_{total}.$$

When the valve is open and this overall force $F_{total}$ is positive it remains open, but as the pressure P increases the force $F_{total}$ becomes negative and the valve 6 closes.

When the valve 6 is fully opened the surfaces 18 and 26 abut flatly, thereby subtracting the surface area of the surface 26 from that of the surface 18, leaving an effective surface area $A_{28}$ exposed at the chamber 28, which is pressurized from the chamber 10 through the passages 17. Thus in the open position the surface area $A_{backward}$ exposed in the backward direction is not $(A_{18} + A_{25})$, but is $(A_{28} + A_{25})$.

As a result, the threshold pressure $P_{close}$ for the valve to close from the full-open position is:

$$P_{close} = F_{16}/(A_{28} + A_{25} - A_{20}).$$

Thus when the spring force $F_{16}$ is overcome the valve body 6 pulls away from the surface 26, thereby exposing the entire surface 18 and suddenly increasing the force effective in the closing direction. As a result the valve 6 will close suddenly.

Once the valve 6 closes it cuts off the chamber 23 and continues to move axially forward against the elastomeric seat element 19 even after the surfaces 19 and 20 abut flatly. Thus shortly after the valve 6 closes the valve 11 is opened to depressurize the downstream compartment 23. This depressurizes the surfaces 20 and 25. As a result once in the closed position the minimum or threshold pressure $P_{open}$ at which the valve 6 opens will be:

$$P_{open} = F_{16}/A_{18},$$

since the surface 25 is no longer pressurized. This threshold pressure $P_{open}$ is much smaller than the pressure $P_{close}$ so the valve 6 will only reopen when the pressure has dropped well below the pressure at which it closed.

Once the valve 6 moves into the fully open position, however, the force holding it in this position will greatly increase to lock it open. The surface area $A_{25}$ of the surface 25 is a major part of the backwardly directed surface area $A_{backward}$. Thus cutting this surface 25 off in the closed position means first that the pressure threshold for closing will be well above that for opening, and that once the valve 6 cracks open it will move slowly into the open position, not banging open. Once in the open position the force holding it there will be greater than the force opening it, to prevent the valve from rattling.

The valve according to this invention will therefore close securely and tightly when the pressure upstream of it exceeds $P_{close}$. Once closed it will open again only when the pressure upstream drops to or below $P_{open}$, which is much lower than $P_{close}$. It is held in the open and closed position by forces substantially greater than the forces effective for opening or closing the valve 6. Meanwhile the valve 11 will depressurize the downstream conduit, so that if pressure rose too high in it before the valve 6 responded, this pressure can be bled off. The port 4 can to this end be connected through a pressure-relief valve to an above-ground vent.

We claim:

1. An overpressure-control valve comprising:
a valve housing formed with
  a vent port,
  a front output chamber,
  a back intake chamber adjacent and back of said output chamber, and
  a valve seat lying between said chambers;
a valve body displaceable in said housing forward toward said valve seat into a closed position on said seat and blocking flow between said chambers and backward from said valve seat and into an open position permitting flow between said chambers, said body having exposed in said chambers at least one forwardly directed face and at least one backwardly directed face, the effective surface area of said forwardly directed face being greater than that of said backwardly directed face;
vent valve means connected to said valve body and openable after said valve body is displaced into said closed position for connecting said output chamber to said vent port; and
biasing means for urging said valve body backward into said open position with a predetermined generally constant biasing force, whereby said valve body moves back against said biasing means into said closed position when the backwardly effective pressure on the forward face overcomes both the force of said biasing means and the pressure on the back face.

2. The overpressure-control valve defined in claim 1, further comprising a conduit having an upstream end opening into said back intake chamber and a downstream end opening generally at said back face.

3. The overpressure-control valve defined in claim 2 wherein said valve body is formed with a passage constituting said conduit.

4. The overpressure-control valve defined in claim 1 wherein said housing has a surface flatly abutting a portion of said back face in said open position, whereby the effective surface area of said back face is reduced by said portion in said open position.

5. The overpressure-control valve defined in claim 1 wherein said output back face is of greater effective surface area than said intake back face.

6. The overpressure-control valve defined in claim 1 wherein said valve body is provided with a limitedly elastically deformable element forming said seat and complementarily shaped to said valve body.

7. The overpressure-control valve defined in claim 1 wherein said element and said valve body have complementary frustoconical surfaces that fit together in said closed position.

8. The overpressure-control valve defined in claim 1 wherein said vent valve means is a slide valve effective between said output chamber and said vent port and having a valve element fixed to said valve body.

9. The overpressure-control valve defined in claim 8 wherein said valve body has a stem connected to said valve element of said vent valve means for joint movement of said valve element and valve body.

10. The overpressure-control valve defined in claim 1 wherein said biasing means includes means for adjusting said biasing force.

11. The overpressure-control valve defined in claim 1 wherein said valve body is provided with an actuation element extending back out of said housing.

* * * * *